(12) United States Patent
Thrall (10) Patent No.: US 7,634,472 B2
(45) Date of Patent: Dec. 15, 2009

(54) CLICK-THROUGH RE-RANKING OF IMAGES AND OTHER DATA

(75) Inventor: John J. Thrall, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 108 days.

(21) Appl. No.: 10/729,621

(22) Filed: Dec. 5, 2003

(65) Prior Publication Data

US 2005/0120311 A1    Jun. 2, 2005

Related U.S. Application Data

(60) Provisional application No. 60/526,308, filed on Dec. 1, 2003.

(51) Int. Cl.
G06F 7/00 (2006.01)
G06F 17/00 (2006.01)

(52) U.S. Cl. .............................. 707/5; 707/7; 707/104.1

(58) Field of Classification Search ........................ None
See application file for complete search history.

(56) References Cited

U.S. PATENT DOCUMENTS 6,640,218 B1 * 10/2003 Golding et al. ............... 707/2
2003/0018626 A1 * 1/2003 Kay et al. .................... 707/3
2003/0216930 A1 * 11/2003 Dunham et al. .............. 705/1
2005/0065916 A1 * 3/2005 Ge et al. ..................... 707/3
2005/0065928 A1 * 3/2005 Mortensen et al. ........... 707/5
2005/0071255 A1 * 3/2005 Wang et al. ................ 705/27
2005/0080772 A1 * 4/2005 Bem .......................... 707/3
2005/0114306 A1 * 5/2005 Shu et al. .................... 707/3

* cited by examiner

Primary Examiner—Charles Rones
Assistant Examiner—Alicia M Lewis
(74) Attorney, Agent, or Firm—Seth H. Ostrow; Ostrow Kaufman & Frankl LLP (57) ABSTRACT

A method and apparatus using feedback obtained by user clicks and the position of the clicked images in the search result to determine user preferences for data that best satisfies particular queries. User click information is tracked to determine which images users click on for particular queries. This information is used to update and improve future query results. The described embodiment determines a user preference score for each image that is clicked for a given query. The placement of a clicked image in the search results is considered when computing the image/query score.

23 Claims, 6 Drawing Sheets

Fig. 4
Details of User Preference Scores

Fig. 3
Create User Preference Scores

| Time click occurred | Query | User info | Fingerprint/ ID of image | Position in search results |
|---|---|---|---|---|

500

Fig. 5
One Record in
Click Info

Fig. 6a
Search result Positions
(Not Query Specific)
600

| 1 | 2 | 3 |
|---|---|---|
| 4 | 5 | 6 |
| 7 | 8 | 9 |
| 10 | 11 | 12 |
| 13 | 14 | 15 |

First page

Fig. 6b
Weights Table (Not Query Specific)
610

| .0576 | .0446 | .0380 |
|---|---|---|
| .0300 | .0293 | .0274 |
| .0231 | .0234 | .0230 |
| .0212 | .0217 | .0212 |
| .0223 | .0230 | .0237 |

First page

Fig. 6c
Weights Table (Not Query Specific)
620

| .0105 | .0103 | .0098 |
|---|---|---|
| .0087 | ... | ... |
| ... | ... | ... |
| ... | ... | ... |
| ... | ... | ... |

Second page

| Query | Fingerprint/ID of image | Position in result | Percentage of clicks expected |
|---|---|---|---|
| roadrunner | A | 1 | .0576 |
| roadrunner | B | 5 | .0293 |
| roadrunner | A | 1 | .0576 |
| roadrunner | A | 1 | .0576 |
| roadrunner | C | 15 | .0237 |
| roadrunner | C | 15 | .0237 |
| roadrunner | A | 2 | .0446 |

Fig. 7
Example of User Preference Scoring

| Image | Clicks expected | Actual clicks | Score (actual/expected) |
|---|---|---|---|
| A | .38045 | 4 | 10.51 |
| B | .2051 | 1 | 4.88 |
| C | .1659 | 2 | 12.06 |

Fig. 8
Example of User Preference Scoring (continued)

CLICK-THROUGH RE-RANKING OF IMAGES AND OTHER DATA

This application claims priority under 35 U.S.C. § 119(e) to U.S. Patent Application Ser. No. 60/526,308, filed on Dec. 1, 2003 by John J. Thrall.

BACKGROUND OF THE INVENTION

1. Field of the Invention

The present invention relates to network search engines and, specifically, to search engines that allow a user to search for content such as images and video on a network.

2. Description of Background Art

Conventional network search engines allow a user to search for web pages and images by entering keywords. Such conventional search engines are used widely in Internet searches, although they can be used to search any large collection of information such as searching an enterprise network.

Traditionally, search engines determined what search results to return by matching words on the web pages to words in the search query. This method works well for text, but does not work as well for images and other non-textual data. For example, if the user enters "roadrunner," images that are somehow labeled as being pictures of roadrunners are returned. For example, the query term may appear in html associated with the image. Obviously, this method results in a high number of search results that are not what the user intended. Many images are mislabeled or labeled in ways that do not suggest the subject of the image.

In addition, a textual query may have several different meanings and may legitimately relate to several different type of images. To continue the previous example, a query of "roadrunner" may results in pictures of both cartoon roadrunners, photographs of birds and images of a Roadrunner model of car. There is no way for the search engine to tell which result the user intended to locate, so it returns images relating to all possible meanings.

Conventional search engines have tried to solve this problem by counting a number of clicks on search results for a query and ranking future search results accordingly. This method does not perform satisfactorily because it does not move images or data deep in the search result toward the top of the search result. If an image is deep within the search result and is clicked on only by one or two persistent users, it will not migrate toward the top of future search results.

What is needed is an improved way of determining search results that are likely to correctly provide the information sought by a user who enters a search query.

SUMMARY OF THE INVENTION

The present invention overcomes the deficiencies and limitations of conventional search engines by using feedback obtained by user clicks and the position of the clicked images to determine user preferences for the search results that best satisfy particular queries. While the embodiments described relate to image data, the present invention can also be used for other types of data such as shopping, video, music, and text searches. For example, the present invention can be used with any type of search where a summary of search results provides detailed and representative information on the content that the user will receive when clicking on the result. User click information is tracked to determine which images users click on for particular queries. This information is used to update and improve future query results.

The described embodiment determines a user preference score for each image that is clicked for a given query. The score tends to favor images that are not located in popular physical positions in the search results (such as images not on page one) and further tends to favor images that receive large numbers of clicks. The score is determined by dividing a number of actual clicks on the image by an expected number of clicks based on the position of the image within the search results. The scores are then used to populate an index used by a search engine to respond to queries.

The features and advantages described in this summary and the following detailed description are not all-inclusive. Many additional features and advantages will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

DETAILED DESCRIPTION OF PREFERRED EMBODIMENTS

Figure 1:
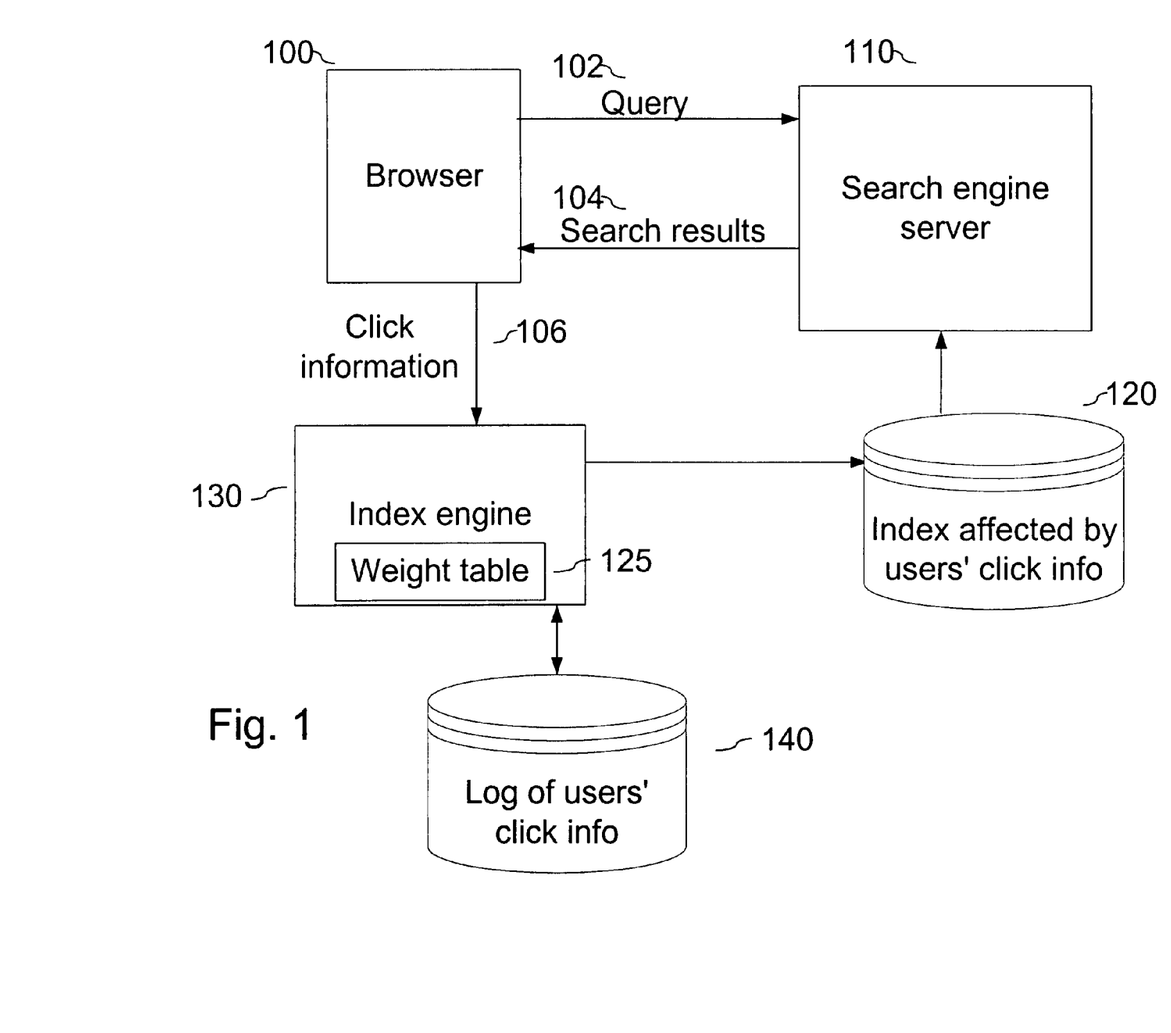
FIG. 1 is a block diagram of a browser retrieving a web page with search results from a server using an embodiment of the present invention.

FIG. 1 is a block diagram of a browser 100 retrieving a web page with search results from a server 110, which uses an embodiment of the present invention. Browser 100 sends a query 102 to a search engine server 110. This query may be sent over a network such as the Internet, or between components using any appropriate method of communicating data. Search engine server 110 returns search results 104, which are preferably displayed by browser 100.

Search engine server 110 uses an index 120 or similar predetermined mechanism to determine what search results most closely match the user's query. The described embodiment relates to a query that has specified an image search. As will be described in more detail below, an index engine 130 uses information about previous user clicks for the query to determine what images are most likely to match what the user is looking for when he or she enters a particular query. Thus, index engine 130 maintains a log 140 of user click information. Index engine 130 also maintains one or more weight tables that keep track of which physical positions on a results page users are most likely to click on, independent of the query entered or search results being displayed. Weight table 125 and the user click information in log 140 help populate index 120, which is then used by search engine 110.

It will be understood that the specific allocation of tasks between components shown in FIG. 1 is presented only as an example. Other systems using the present invention may allocate tasks differently between components of the system or between components not shown in FIG. 1. Certain embodiments operate in real time, instead or periodically updating the index.

The described embodiment of the present invention is implemented in software, although other embodiments may be implemented in hardware or a combination of software, hardware and/or firmware. The functionality described herein is preferably implemented as software modules, although different implementations may distribute the described functionality in various ways within the software modules.

Figure 2:
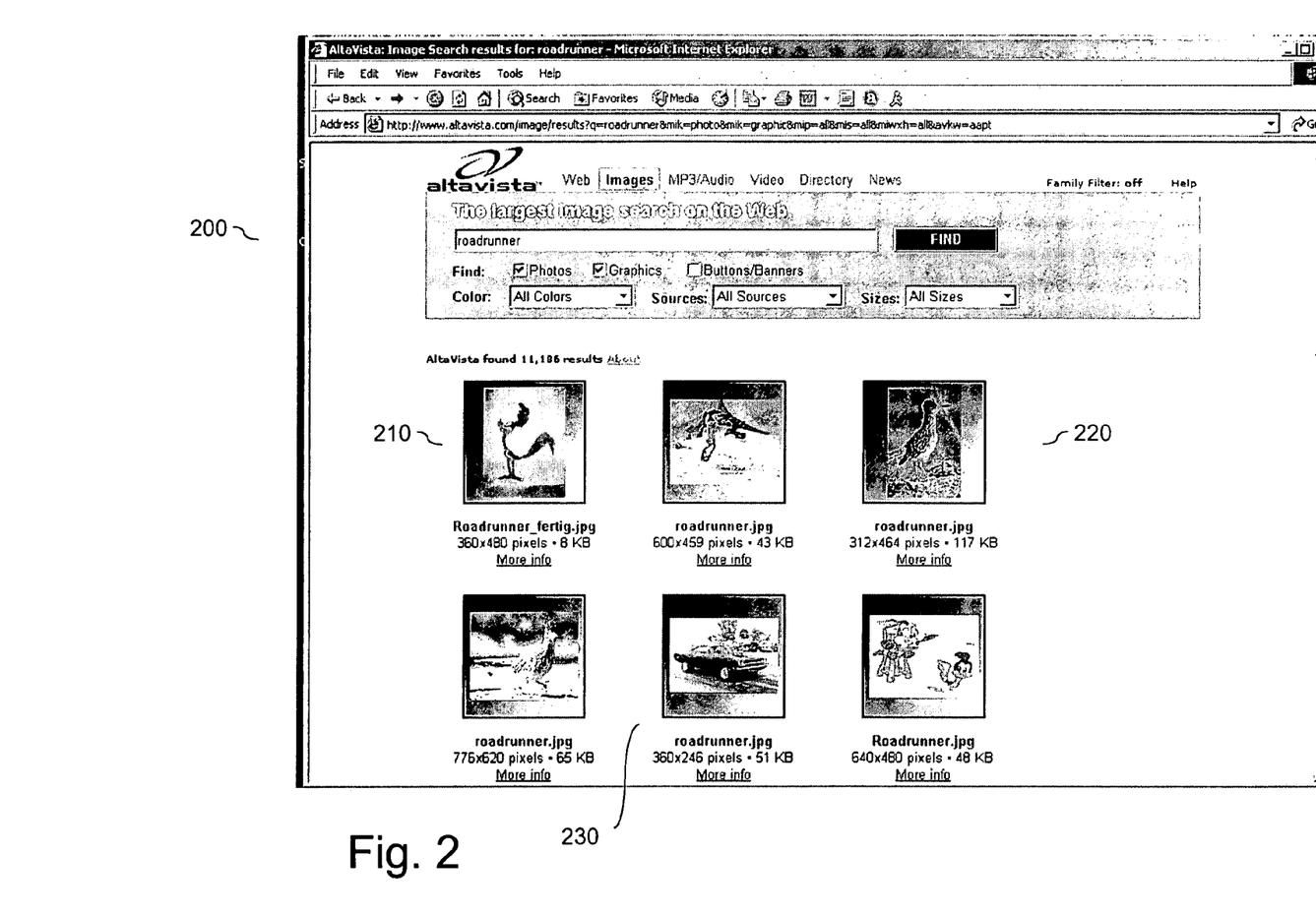
FIG. 2 shows an example search results for a query.

FIG. 2 shows example search results 200 for a query. This query may, but need not, originate from a human being. In the example, the user entered the query "roadrunner". As can be seen in the figure, this query returned images of cartoon roadrunners, such as image 210; photographs of the roadrunner bird, such as image 220; and images of cars having a model name of Roadrunner, such as image 230. None of these results is "wrong" since all relate to roadrunners. It may be, however, that many more people who enter a query of "roadrunner" are actually looking for information about the roadrunner bird. If so, more people will click on the thumbnails of the roadrunner bird in the search results. Click information 106 about this click will be stored in the user click log 140 and used in future updates to index 120.

It should be noted that what people are looking for when they enter a particular query such as "roadrunner" may change with time. For example, if there is a resurgence of interest in the Roadrunner model car, it may eventually occur that more people who enter "roadrunner" are looking for images of cars, instead of images of the roadrunner bird. If this is the case, this change in user preferences will be reflected in the users' click information, which will eventually be reflected in future search results.

Figure 3:
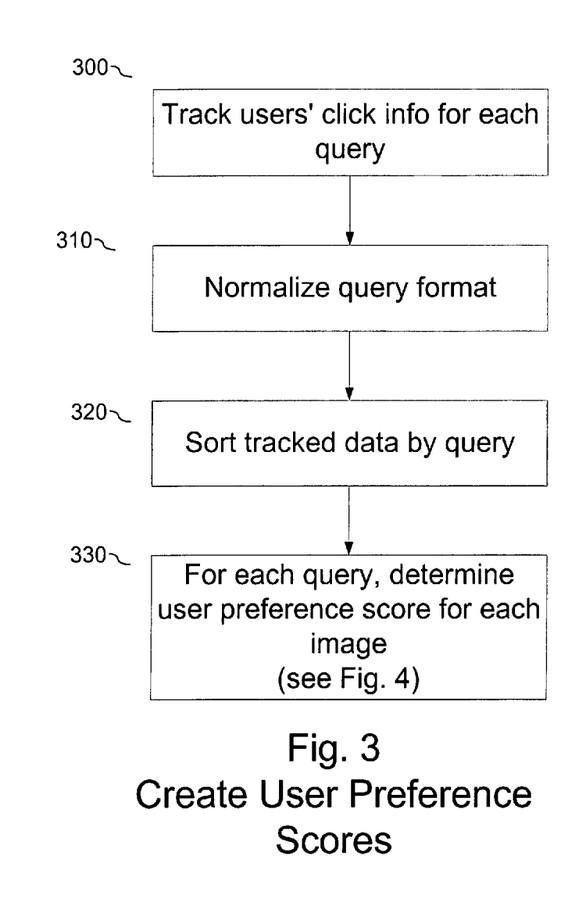
FIGS. 3 and 4 are flow charts showing how a user preference score is created for images.
Figure 4:
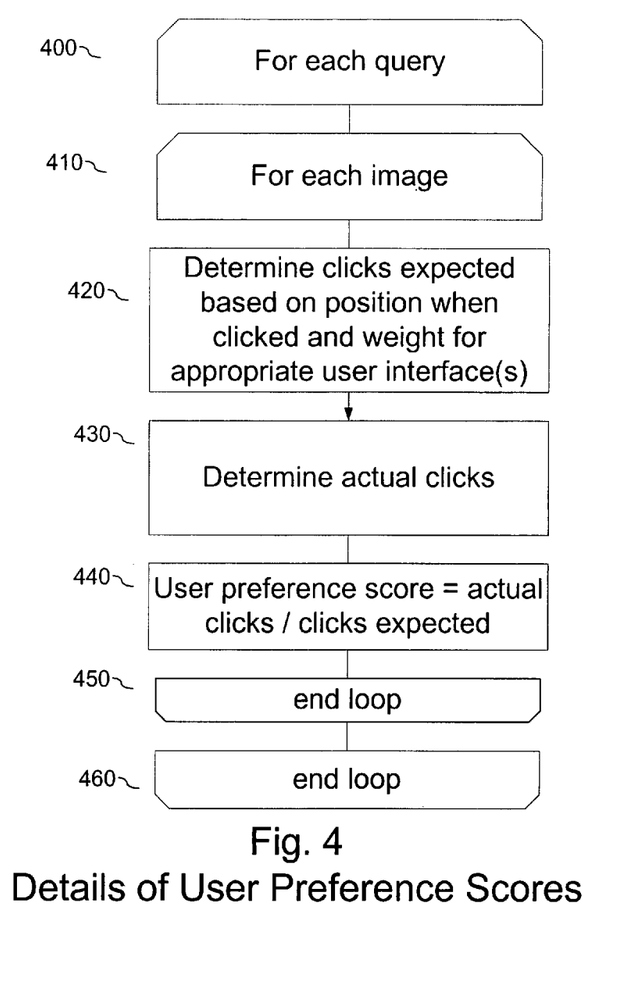
Figure 5:
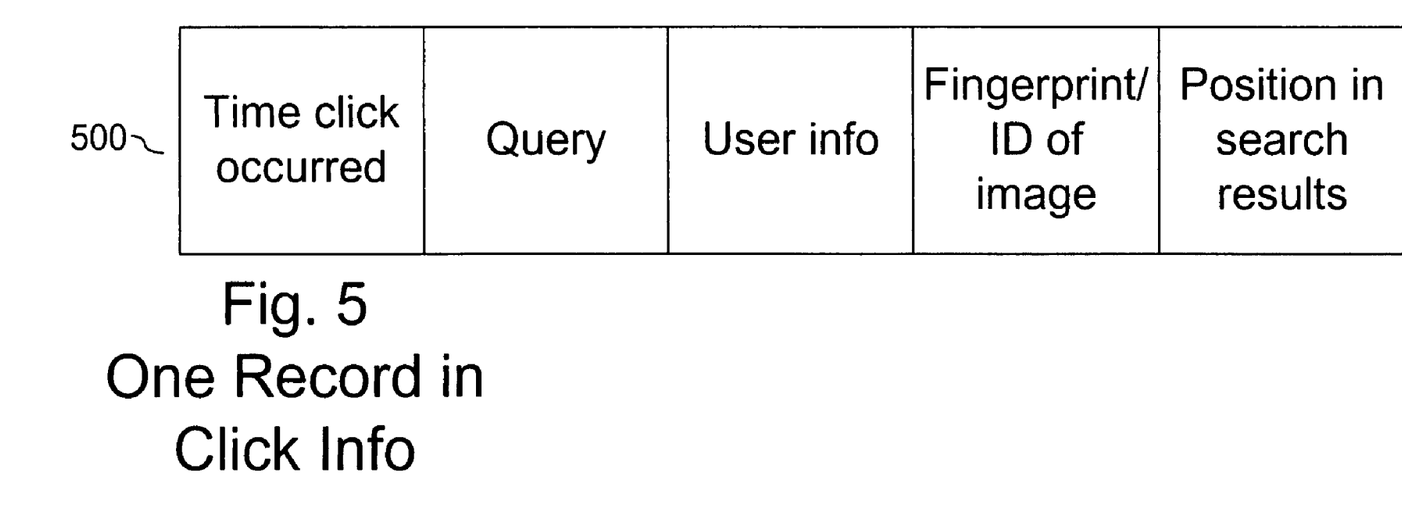
FIG. 5 is an example record format for information saved per user click on search results.

FIGS. 3 and 4 are flow charts showing how user preference scores are created for images. These methods are preferably performed periodically, such as weekly. For example, while click information is stored on an ongoing basis, new scores for images may be computed on a weekly basis, using the data from the previous time period. Other embodiments may perform these methods in real time or close to real time. As discussed above, user click information is tracked 300 and stored in log 140. FIG. 5 shows an example format 500 for a click information record in log 140. It contains:

a time the click occurred (preferably day and time),
the query whose results were displayed at the time of the click (for example "roadrunner"),
user information identifying the user, although not necessarily in a manner that will allow the user's name or other identifying information to be determinable (e.g., IP address and cookie information). This could also include a user profile including demographic data for the user (e.g., income or education level),
a fingerprint or other ID for the image that was clicked on, and
the position in the search results in which the clicked images was displayed.

Other formats containing more or fewer data items can also be used for the click information log data without departing from the spirit and scope of the invention.

The following paragraphs describe how a user preference score is determined. During periodic updates, the click information in log 140 is normalized 310. Some embodiments do not normalize the query, although some degree of normalization is helpful. Normalization includes, for example, removing multiple clicks by the same user on the same image for a same query within a predetermined time period. This removal ensures that a single user will not be able to overly influence the placement of an image in search results. Another example of normalization is query normalization in which multiple query terms are placed in some predetermined order, such as alphabetical order. Thus "roadrunner food" will normalize to the same query as "food roadrunner." In the described embodiment, only user clicks within a predetermined period of time, such as the last six weeks is used to determine user preference scores. Normalization can also include normalization of spacing and normalization of encoding of the query and any other appropriate normalization processing.

The click information log data 140 is sorted by query 320 and a score is determined 330 for each image that was clicked on for each query. Thus, if an image of a roadrunner was returned in search results for the separate queries "roadrunner" and "beep beep," that image would have multiple scores—one for each query for which it was returned.

FIG. 4 shows details of how a user preference score is determined. The method of FIG. 4 is performed for each query (loop 400/460) and for each image clicked on for a query (loop 410/450). For each image, an expected clicks value is determined, based on the physical position(s) in the result set when clicks on the image occurred and further based on the number of clicks and a weight accorded with the physical position(s). As an example, roadrunner image 210 of FIG. 2 is in position 1 and roadrunner image 220 is in position 3. An actually number of clicks on the image for the query is also determined 430 from log 140. The user preference score 440 of the image is computed from dividing the actual number of the click by the expected number of clicks.

Figure 7:
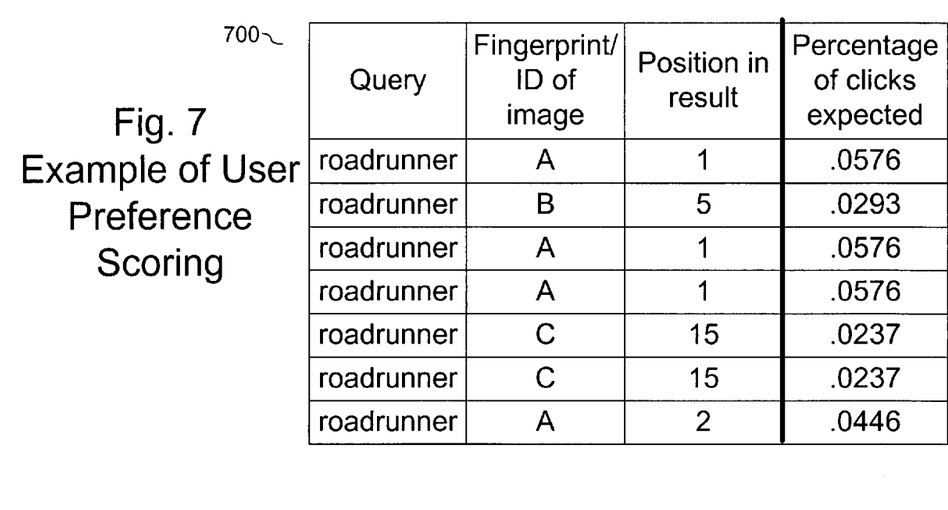
FIGS. 7 and 8 are example of how user preference scores are computed for images resulting from a query.
Figure 8:
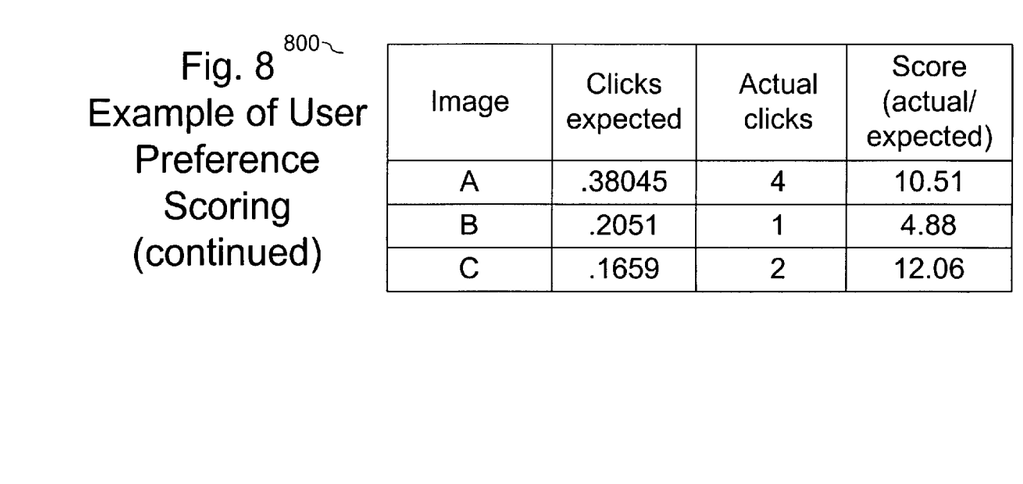

FIGS. 7 and 8 provide an example of how user preference scores are computed for images resulting from a query. In the example, various users clicked three images (A, B, and C) when presented with query results for the query "roadrunner". The users doing the clicking are usually, but need not be, human beings. Although the word "click" is used in this description, any appropriate method of selecting from search results may be used, such as using a touch screen or otherwise indicating a user choice.

As shown in FIG. 7, image A occupied two different positions on the results page, 700, during the time click information was being collected (position 1 and position 2). This may occur, for example, if the search index was recomputed during the track period or if the images were added or removed from the search pool. Image A was clicked 4 times. Image B occupied position 5 and was clicked once. Image C occupied position 15 and was clicked on twice. The percentages of clicks expected column in FIG. 7 is taken from a position weight table, such as that shown in FIGS. 6(b) and 6(c).

Figure 6A:
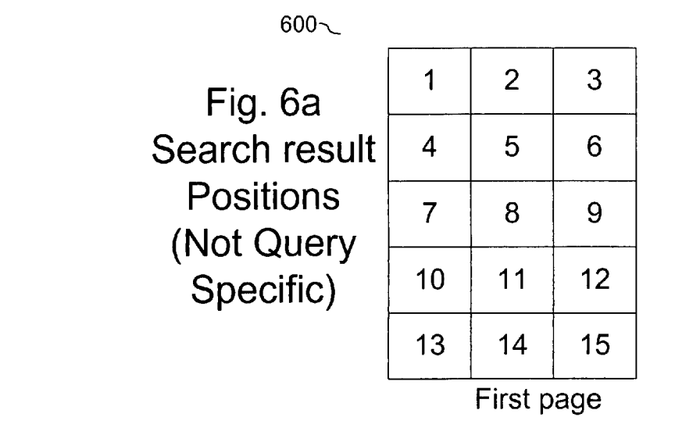
FIG. 6a shows an example of search result positions for a first page of search results.

FIG. 6a shows an example of search result positions for a first page of search results 600. Thus, in this example, image 210 of FIG. 2 is in position 1 and image 220 of FIG. 2 is in position 2. Other implementations of the invention use different numbering schemes.

Figure 6B:
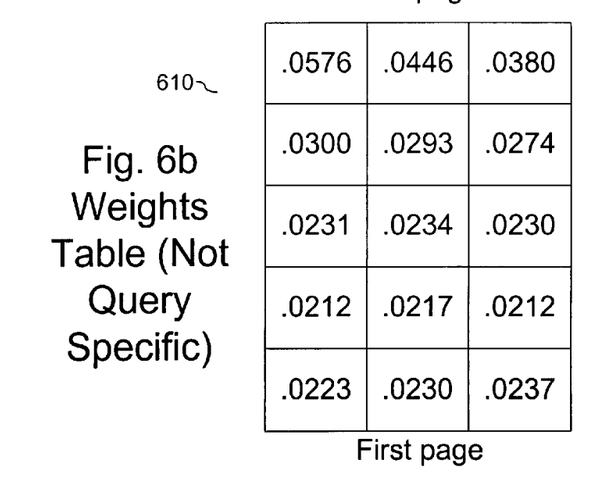
FIGS. 6(b) and 6(c) show an example weight table for two pages from an example interface.
Figure 6C:
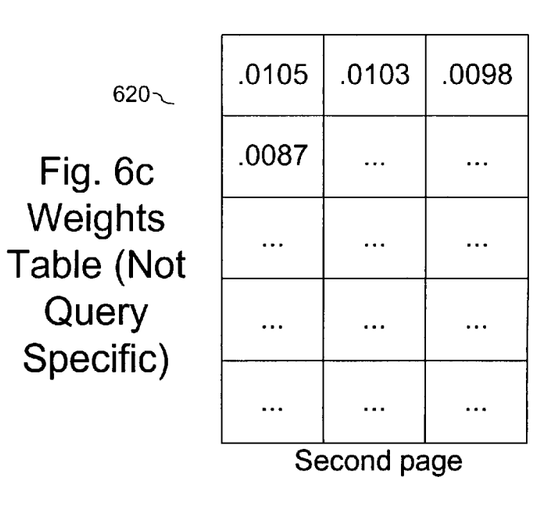

FIGS. 6(b) and 6(c) show an example position weight table 610 and 620. The position weight table shows the weights given to clicks on images located in various search result positions for an example user interface displaying search results. These weights are not query specific and preferably a different table is used for each interface. In general, in has been determined that users tend to click most on the first row of search results, no matter what the query or results presented. The next most popular is the bottom row of search results and the third most popular id the middle column. The weights in the weight table 610 and 620 of FIGS. 6(b) and 6(c) are computed by, for example, trial and error, by analyzing actual clickthrough data (i.e., observed user click behavior), or by any other acceptable method that takes in to account user preferences in position within search results. The weight table preferably is computed periodically, for example, weekly.

In general, it should be noted that these weights are derived from observed click information. The weights are "contextual," in the sense that the weight table is computed for the specific product and interface, i.e., a video search weight table would be different than an image search weight table, and a weight table for an image search from a first source is different than a weight table for an image search from a second source (because the display interface is different). We know, however, which product or interface is associated with a particular user click and use the associated weight table for that interface or product. This allows leveraging of click information from a variety of interfaces to compute the overall relevance score for a query/image pair. Thus, more than one weight table might be used to compute a score for a particular query/image pair. For example, the image might have been included in search results displayed using more than one user interface, its percentage of clicks expected values would come from more than one table.

In the example weight table of FIGS. 6(b) and 6(c), the weights shown are:

1 0.0576
2 0.0446
3 0.0380
4 0.0300
5 0.0293
6 0.0274
7 0.0231
8 0.0234
9 0.0230
10 0.0212
11 0.0217
12 0.0212
13 0.0223
14 0.0230
15 0.0237
16 0.0105
17 0.0103
18 0.0098
19 0.0087
. . .

It will be understood that the weight tables contain more weights not shown in this example. Various embodiments will have a predetermined number of weight tables corresponding to a predetermined number of pages; Other embodiments may numerically compute a weight if an image is placed low enough in the search results that no table exists. Other embodiments may compute a weight numerically for all images instead of using a table-based implementation.

In the example, result positions 1-15 were on page one and result positions 16-30 were on page two of the user interface. The weight tables for subsequent pages are not shown . since they are not needed for this example. In the example and as shown in FIG. 6(b), position 1 (image A) is: assigned a weight of 0.0576, Position 2 (image A) is assigned a weight of 0.0446. Position 5 (image B) is assigned a weight of 0.0293. Position 15 (image C) is assigned a weight of 0.0237.

"Clicks expected" is then computed for each, image (420 of FIG. 4). The average of the, weights for the positions in which each image was clicked is determined. Then, because there are 7 total clicks, the average weight is multiplied by 7 to give the allocation of clicks we expect based on position. For example, for image A there were 3 clicks in position 1, each with weight 0.0576, and one click in position 2, with weight 0.0446. The average of the weights for image A is (0.0576+0.0576+0.0576+0.0446)/4, or 0.05435. The clicks expected=7*0.05435=0.38045.

FIG. 8. continues the example of determining an image user preference score for a query 800. For the current query, the number of actual clicks on each image is determined. In the example, image A has 4 actual clicks; image B has 1 actual click; and image C has 2 actual clicks. Next, the "clicks expected values for the images are summed".

Clicks expected for A=(0.0576+0.0576+0.0576+0.0446)/4*7=0.3 8045
Clicks expected for B=(0.0293)/1*7=0.2051
Clicks expected for C=(0.0237+0.0237)/2*7=0.1659
User preference scores for images A, B, and C for the query "roadrunner" are:
A's score=4/0.38045=10.51
B's score=1/0.2051=4.88
C's score=2/0.1659=12.06

Thus, image C, which was at position 15, has the highest user preference score. Image A, which was clicked on 4 times and was at either position 1 or 2, has the next highest score and image B, which was at position 5, had the lowest score.

In the described embodiments, the scores for images C, A, and B will result in those images being first in order the next time the query "roadrunner" is received. In the described embodiment, the user preference score is used as a feature in ranking. In the described embodiment, user preference score is the dominant feature in determining search result ranking, meaning that it trumps everything else. Other embodiments may use user preference score as one of a combination of features used to determine search result ranking. The ranking is not preferably updated instantaneously, but instead is updated on the timeline of when the user preference score is computed and propagated to the serving machines such as engine 130 (preferably weekly). Another implementation, however, updates user preference scores in real-time. Additional results for future "roadrunner" search results are obtained by other methods well-known in the art, such as analysis of the name of the image.

Note that in the described embodiment, result positions popular with users are weighted high, while unpopular positions (such as positions not on page 1, etc) are weighted low. Because an image's user preference score is determined by dividing actual clicks by clicks expected, a high weight tends to result in a high "expected click" value, which tends to result in a lower image score. Similarly, high numbers of actual clicks high tends to result in a higher image score. Thus, if a user clicks on an image on the second page of search results, that click will be weighted low and will tend to have more influence on the image score than will clicks in the more popular result positions. The reasoning behind this weighting scheme is that if a user takes the time to search for and click on an image in an unpopular result position, the image at that result position must be particularly relevant to the query. Thus, relevant images buried in search results tend to migrate upwards in future search results. In general, underspecified queries, defined as queries that have few search terms, are the ones helped the most by the present invention. This is because short queries tend to have more click information associated with them than do longer queries. In addition, underspecified queries tend to be more ambiguous in nature and benefit from allowing user to "teach" the search engine what the proper interpretation of the query should be.

While "unpopular result positions are often those deep within search results (such as on a page other than page one of the search result), some embodiments may define unpopular result positions in other ways. For example, some implementations may present user interface layouts where a second and third result position are the most popular and the first result position is unpopular. In such a case, the weight table would be set up to reflect the popularity of the positions accordingly.

Some embodiments of the present invention contain additional checks and balances that are used when analyzing click information. For example, certain embodiments require receipt of a predetermined number of clicks from different users for a specific image and query (e.g., 10), before they will use click information to affect the ranking of that image.

Other embodiments do not score images identified by female names or known adult terms. These limitations help eliminate query results that relate to adult images from migrating to the top of search results. As an example, in at least one embodiment, if the "family friendly" filter is turned on in a user's browser, the filter will eliminate adult images from the first 200 or so images returned in a search result. If a user is persistent and looks past those first 200 images to click on an image with adult content, the fact that the image was located deep within the result set will tend to migrate the image to the top of the result set when the same query is entered in the future. Eliminating images having female names and adult terms from scoring eliminates this problem.

As an aside, this side effect provides a mechanism for eliminating images that have been incorrectly identified as adult queries, since users tend to be good at finding these mis-tagged images.

The present invention has been described above in connection with image searching. Other embodiments use the invention in connection with other types of searches, such as a shopping search. Shopping searches are similar to image searches because there is not one right answer to a query. If, for example, a user enters "cell phone" he will expect to have information returned on a wide range of available cell phones. Ideally, the cell phones that other users have clicked on most in the past or that have been unjustly buried in the search results should be at the top of future search results. Note that shopping searches may, but do not necessarily contain images as part of the displayed search result. Some shopping searches might, for example, only result in textual search results or in a mix of text and images. The present invention can be used to obtain this result.

As will be understood by those familiar with the art, the invention may be embodied in other specific forms without departing from the spirit or essential characteristics thereof. For example, other embodiments may decrease the periodicity of recomputing and applying user preference scores (in real-time, for example). Still other embodiments may compute context dependent user preference scores (for example, computing different user preference scores for different country markets, languages, and time of day, day of week, or demographic profile of user, if such data is available and can be associated with the user click information). The present invention also can be used for a search result that mixes images with text or that displays only textual search results. Accordingly, the disclosure of the present invention is intended to be illustrative, but not limiting, of the scope of the invention, which is set forth in the following claims.

What is claimed is:

1. A computerized method of scoring data for use in a search engine, comprising:
   tracking clicks by users on data returned in a search result in response to a query;
   determining, using a processing device, a user preference for a clicked data in accordance with a physical position of the clicked data in the search result, wherein determining the user preference for the clicked data is performed by:
     determining a ratio calculating the quotient of actual clicks to the clicked data and a specific query and clicks expected for the clicked data and the specific query,
     wherein determining clicks expected for the clicked data and the specific query is performed by determining a context dependent user preference score in accordance with at least one weight table that comprises a contextual weight for the clicked data in accordance with physical position, the weight table specifically associated with one of a plurality of user interfaces based on a visual layout of the user interface, the contextual weight indicating a product associated with the clicked data; and
   using the determined user preference to determine, using the processing device, rankings for display of future search results.

2. The method of claim 1, wherein determining a user preference for a clicked data is further performed in accordance with a number of clicks made by users on the data returned in the search result.

3. The method of claim 1, wherein determining a user preference is performed periodically.

4. The method of claim 1, wherein determining a user preference is performed weekly.

5. The method of claim 1, wherein determining a user preference is performed in real time.

6. The method of claim 1, further comprising determining values in a weight table based on user preferences for physical positions within search results independent of a query.

7. The method of claim 1, wherein determining a user preference for a clicked data in accordance with a physical position of the data in the search result is performed in accordance with weight values determined by observed user click behavior.

8. The method of claim 1, wherein determining a user preference for a clicked data in accordance with a physical position of the data in the search result is performed in accordance with weight values determined by trial and error.

9. The method of claim 1, wherein tracking clicks by users includes tracking: a query, a data fingerprint, and a position in the search results for a click on data from a search result for a specific query.

10. The method of claim 9, wherein tracking clicks by users further includes tracking: a time the click occurred and user ID information.

11. The method of claim 1, wherein determining a user preference further includes weighting click information so that clicks by users on data in unpopular positions in the search result migrate that data toward the top of future search results.

12. The method of claim 1, further including normalizing the click information before the determining step.

13. The method of claim 1, wherein the data is image data.

14. The method of claim 1, wherein the data is shopping data.

15. The method of claim 1, wherein the data is textual data.

16. The method of claim 1, wherein determining a user preference includes determining context dependent user preference scores in accordance with a characteristic of the users clicking on the search results.

17. An apparatus that scores data for use in a search engine, comprising:
   a processing device;

a module executed by the processing device that tracks clicks by users on data returned in a search result in response to a query; and a module executed by the processing device that determines a user preference for a clicked data in accordance with a physical position of the clicked data in the search result, wherein determining the user preference for the clicked data is performed by:

determining a ratio calculating the quotient of actual clicks to the clicked data and a specific query and clicks expected for the clicked data and the specific query,     wherein determining clicks expected for the clicked data and the specific query is performed by determining a context dependent user preference score in accordance with a weight table that comprises a contextual weight for the clicked data in accordance with physical position, the weight table specifically associated with one of a plurality of user interfaces based on a visual layout of the user interface, the contextual weight indicating a product associated with the clicked data; and a module executed by the processing device that uses the determined user preference to determine rankings for display of future search results.

18. The apparatus of claim 17, wherein determining a user preference for a clicked data is further performed in accordance with a number of clicks made by users on the data returned in the search result.

19. The apparatus of claim 17, wherein determining a user preference for a clicked data in accordance with a physical position of the data in the search result is performed in accordance with weight values determined by observed user click behavior.

20. The apparatus of claim 17, wherein determining a user preference further includes weighting click information so that clicks by users on data in unpopular positions in the search result migrate that data toward the top of future search results.

21. The apparatus of claim 17, wherein the data is image data.

22. The apparatus of claim 17, wherein determining a user preference uses a plurality of weight tables corresponding to ones of a plurality of user interfaces displaying the search result.

23. A computer program product, including computer instructions on a computer-readable medium, the instructions configured to cause computer to perform the following:

tracking clicks by users on data returned in a search result in response to a query; and     determining a user preference for a clicked data in accordance with a physical position of the clicked data in the search result, wherein determining the user preference for the clicked data is performed by:

determining a ratio calculating the quotient of actual clicks to the clicked data and a specific query and clicks expected for the clicked data and the specific query,         wherein determining clicks expected for the clicked data and the specific query is performed by determining a context dependent user preference score in accordance with a weight table that comprises a weight for the clicked data in accordance with physical position, the weight table specifically associated with one of a plurality of user interfaces based on a visual layout of the user interface, the contextual weight indicating a product associated with the clicked data; and     using the determined user preference to determine rankings for display of future search results.

\* \* \* \* \*

UNITED STATES PATENT AND TRADEMARK OFFICE
CERTIFICATE OF CORRECTION

| | | |
|---|---|---|
| PATENT NO. | : 7,634,472 B2 | |
| APPLICATION NO. | : 10/729621 | |
| DATED | : December 15, 2009 | |
| INVENTOR(S) | : John J. Thrall | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 184 days.

Signed and Sealed this

Ninth Day of November, 2010

David J. Kappos
*Director of the United States Patent and Trademark Office*